(12) United States Patent
Sandstrom

(10) Patent No.: US 11,547,174 B2
(45) Date of Patent: Jan. 10, 2023

(54) FOOTWEAR AND RUBBER SOLE CONTAINING DUAL SILICA MOIETIES

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 289 days.

(21) Appl. No.: 16/520,013

(22) Filed: Jul. 23, 2019

(65) Prior Publication Data
US 2020/0146394 A1    May 14, 2020

Related U.S. Application Data

(60) Provisional application No. 62/758,728, filed on Nov. 12, 2018.

(51) Int. Cl.
| | | |
|---|---|---|
| *A43B 13/04* | (2006.01) | |
| *C08L 9/06* | (2006.01) | |
| *C08K 3/36* | (2006.01) | |
| *C08K 3/04* | (2006.01) | |
| *C08K 9/06* | (2006.01) | |

(52) U.S. Cl.
CPC .............. *A43B 13/04* (2013.01); *C08K 3/04* (2013.01); *C08K 3/36* (2013.01); *C08K 9/06* (2013.01); *C08L 9/06* (2013.01)

(58) Field of Classification Search
CPC .. A43B 13/04; C08L 9/06; C08K 9/06; C08K 3/04; C08K 3/03; C08K 3/36
See application file for complete search history.

(56) References Cited

U.S. PATENT DOCUMENTS

| | | | |
|---|---|---|---|
| 6,939,921 B2 | 9/2005 | Waddell et al. | |
| 7,134,468 B2 | 11/2006 | Sandstrom | |
| 7,249,621 B2 | 7/2007 | Sandstrom | |
| 7,737,204 B2 | 6/2010 | Sandstrom | |
| 7,928,157 B2 | 4/2011 | Sandstrom et al. | |
| 8,522,847 B2 | 9/2013 | Sandstrom et al. | |
| 9,163,126 B2 | 10/2015 | Sandstrom | |
| 9,205,704 B2 * | 12/2015 | Sandstrom ............ | B60C 1/0016 |
| 9,212,275 B2 | 12/2015 | Sandstrom et al. | |
| 9,873,780 B1 | 1/2018 | Sandstrom | |
| 2006/0000532 A1 | 1/2006 | Sandstrom | |
| 2006/0021688 A1 | 2/2006 | Sandstrom | |
| 2008/0066840 A1 | 3/2008 | Sandstrom et al. | |
| 2009/0151830 A1 * | 6/2009 | Sandstrom ............... | C08K 9/04 |
| | | | 152/209.1 |
| 2010/0160513 A1 * | 6/2010 | Sandstrom ............. | C08K 5/098 |
| | | | 524/274 |
| 2012/0101193 A1 | 4/2012 | Sandstrom | |
| 2015/0107733 A1 * | 4/2015 | Sandstrom ............... | C09J 11/06 |
| | | | 152/209.1 |
| 2017/0210881 A1 | 7/2017 | Miyazaki | |

FOREIGN PATENT DOCUMENTS

| | | |
|---|---|---|
| CN | 101463152 A | 6/2009 |
| CN | 105778172 A | 7/2016 |
| JP | 2005008650 A | 1/2005 |
| KR | 100852972 B1 | 8/2008 |

OTHER PUBLICATIONS

Chinese Search Report for Serial No. 201911100106.8 dated Sep. 2, 2021.

* cited by examiner

*Primary Examiner* — Robert D Harlan
(74) *Attorney, Agent, or Firm* — Mandy B. Willis; John D. De Long

(57) ABSTRACT

The invention relates to footwear with a rubber sole and to such rubber sole where the sole is provided with a rubber composition which contains dual precipitated silica moieties. The dual precipitated silica moieties are provided in a sense of being comprised of hydrophilic precipitated silica and hydrophobic precipitated silica.

19 Claims, No Drawings

FOOTWEAR AND RUBBER SOLE CONTAINING DUAL SILICA MOIETIES

FIELD OF THE INVENTION

The invention relates to footwear with a rubber sole and to such rubber sole where the sole is provided with a rubber composition which contains dual precipitated silica moieties. The dual precipitated silica moieties are provided in a sense of being comprised of hydrophilic precipitated silica and hydrophobic precipitated silica.

BACKGROUND OF THE INVENTION

It is sometimes desirable for footwear to have a rubber sole intended to permit surface engagement comprised of a rubber composition to promote traction of the footwear sole's surface engaged with an external surface (e.g. ground) and to aid in promoting adaptability of the rubber sole over a wide range of atmospheric temperatures.

In practice, a conventional article of footwear includes a combination of two primary elements, namely an upper portion and a sole portion. The sole portion contains a sole with an outer surface intended to permit ground (external surface) engagement. The upper portion of the footwear provides a covering for the foot of the wearer of the footwear and positions the foot with respect to the associated sole portion. The sole portion is secured to a lower part of the upper portion of the footwear and, in practice, is intended to be positioned between the upper portion and external surface to which the sole is intended to permit contact. The sole portion provides traction through its outer surface upon engagement with an external surface and also aids in controlling foot balance and control for the footwear. Accordingly, the upper portion and associated sole portion secured to the upper portion operate in a cooperative combination to provide a footwear structure suitable for one or more ambulatory activities such as, for example, walking, running and sports related activities.

In practice, rubber compositions for rubber soles for footwear may sometimes contain rubber reinforcing filler comprised of precipitated silica (amorphous prepared precipitated silica) or a combination of rubber reinforcing carbon black and precipitated silica which is often comprised primarily, or even almost entirely, of precipitated silica, usually together with a silica coupler compound to aid in coupling the precipitated silica to one or more diene-based elastomers contained in the footwear sole rubber composition.

Here, it is proposed to evaluate providing such footwear sole with a rubber composition containing filler reinforcement in a form of dual precipitated silica moieties comprised of hydrophilic precipitated silica and hydrophobic precipitated silica. The hydrophobic precipitated silica is hydrophilic precipitated silica which has been hydrophobated to render it more compatible with the footwear sole rubber composition.

A hydrophilic precipitated silica is a synthetic amorphous precipitated silica which is hydrophilic (water loving) in nature and therefore not generally easily compatible with diene-based elastomers in rubber compositions. Therefore, it is sometimes desirable to hydrophobate the hydrophilic precipitated silica to make it more compatible with diene-based elastomers in a rubber composition.

A hydrophobic precipitated silica is normally a hydrophilic precipitated silica which has been hydrophobated by treatment with, for example, at least one of a bis(3-triethoxysilylpropyl) polysulfide (a silica coupling agent) and organomercaptoalkoxysilane (a silica coupling agent) which may optionally include an alkoxysilane (not a silica coupling agent).

While the mechanism is not fully understood, it has been observed in U.S. Pat. No. 8,522,847 that the use of a combination of dual precipitated silica moieties, namely a combination of in situ hydrophobated precipitated silica (particularly when hydrophobated in situ with an organoalkoxysilyl polysulfide or organomercaptoalkoxysilane coupling agent) and hydrophilic precipitated silica, in a diene-based elastomer tire tread composition can beneficially provide a tire tread with one or more physical properties which are different than when using only a hydrophobated precipitated silica or when only using a hydrophilic precipitated silica. For example, it has been observed that a tire tread running surface having a relatively high wet coefficient of friction can be promoted by using such combination of such dual silica moieties as compared to a tire tread containing a significant hydrophobic precipitated silica content (hydrophilic precipitated silica hydrophobated in situ with a silica coupling agent) without the presence of a hydrophilic precipitated silica. Apparently, the hydrophobic precipitated silica acted to enhance desirable physical properties of the tire tread rubber composition, whereas the hydrophilic precipitated silica was observed to not enhance the tread rubber physical properties in the manner of the hydrophobic precipitated silica.

It is considered herein that use of such dual silica moieties in a rubber sole for footwear is novel and a departure from past practice.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a footwear rubber sole for footwear intended for ground engagement (external surface engagement) is comprised of a rubber composition which contains at least one diene-based rubber and filler reinforcement comprised of dual silica moieties comprised of a combination of hydrophobic precipitated silica and hydrophilic precipitated silica.

In one embodiment, such hydrophobic precipitated silica (hydrophobated hydrophilic precipitated silica) is the product of hydrophilic precipitated silica treated (hydrophobated) with at least one of bis(3-trialkoxysilylalkyl) polysulfide having an average of from about 2 to about 4 connecting sulfur atoms in its polysulfidic bridge and an organoalkoxymercapto silane, optionally together with an alkoxysilane. Representative of said bis(3-trialkoxysilylalkyl) polysulfide is bis(3-triethoxysilylpropyl) polysulfide.

In one embodiment, said hydrophobated precipitated silica is a product of said hydrophilic precipitated silica treated (hydrophobated) in situ within the rubber composition (during a mechanical mixing step).

In one embodiment, said hydrophobated precipitated silica is a product of said hydrophilic precipitated silica pre-treated (pre-hydrophobated) to form a composite thereof prior to addition of said composite to the rubber composition. (Therefore, the composite is added to the rubber composition.)

In one embodiment, then, said footwear sole rubber composition is prepared by blending at least one diene-based elastomer with a combination of hydrophilic precipitated silica and hydrophobic precipitated silica, where said hydrophobic precipitated silica is the product of hydrophilic precipitated silica treated in situ within the rubber composition or pre-treated prior to addition to the rubber composition, with at least one of bis(3-trialkoxysilylalkyl) polysulfide having an average of from about 2 to about 4 connecting sulfur atoms in its polysulfidic bridge and an organoalkoxymercapto silane, optionally together with an alkoxysilane. Representative of said bis(3-trialkoxysilylalkyl) polysulfide is bis(3-triethoxysilylpropyl) polysulfide.

Therefore, in one embodiment, a footwear rubber sole is a rubber composition comprised of, based upon parts by weight per 100 parts by weight of rubber (phr):
(A) at least one conjugated diene-based elastomer, and
(B) about 20 to about 120, alternately about 40 to about 120, phr of reinforcing filler comprised of:
  (1) precipitated silica, or
  (2) a combination of precipitated silica and rubber reinforcing carbon black containing up to about 60, alternately about 5 to about 60, phr of rubber reinforcing carbon black;
  wherein said precipitated silica of (B)(1) and (B)(2) is comprised of:
  (3) about 50 to about 95, alternately from about 50 to about 80, weight percent of composite of hydrophobic precipitated silica, and
  (4) about 5 to about 50, alternately about 20 to about 50, weight percent hydrophilic precipitated silica.

In one embodiment, said hydrophobic precipitated silica is provided as a product of hydrophilic precipitated silica pre-treated with a silica coupling agent prior to introduction to the rubber composition, where said silica coupling agent has a moiety reactive with hydroxyl groups on a precipitated silica and another different moiety interactive with a diene-based elastomer contained in the rubber composition. Therefore, the hydrophobic precipitated silica is provided as a pre-treated hydrophilic precipitated silica with a silica coupler comprised of, for example, at least one of bis(3-triethoxysilylpropyl) polysulfide and organomercaptoalkoxysilane which may also include an alkoxysilane. A hydrophilic precipitated silica is thereafter added to the rubber composition without a free addition of a silica coupler.

Therefore, a method for providing a footwear rubber sole of a rubber composition containing a combination of hydrophobic precipitated silica and hydrophilic precipitated silica comprises pre-treating a hydrophilic precipitated silica with a silica coupler to form a composite thereof where said silica coupler comprises, for example, at least one of bis(3-triethoxysilylpropyl) polysulfide and organomercaptoalkoxysilane which may also include an alkoxysilane, addition of the composite to a rubber composition containing at least one of aforesaid diene-based elastomers and thereafter adding a hydrophilic precipitated silica to the rubber without additional silica coupler either prior to, coincidentally with or subsequent to said addition of said hydrophobic precipitated silica. A rubber composition is therefore provided by such method.

In another embodiment, said hydrophobated precipitated silica is provided as a hydrophilic precipitated silica treated in situ within the rubber composition with a silica coupling agent having a moiety reactive with hydroxyl groups on a precipitated silica and another different moiety interactive with a diene-based elastomer contained in the rubber composition. For such preparation, a hydrophilic precipitated silica is subsequently thereafter added to the rubber composition without additional coupling agent in a separate mixing step. The hydrophobic precipitated silica is thereby provided as a hydrophilic precipitated silica treated in situ within said rubber composition with a silica coupler comprised of, for example, at least one of bis(3-triethoxysilylpropyl) polysulfide and organomercaptoalkoxysilane prior to a separate addition of additional hydrophilic precipitated silica which may optionally include an alkoxysilane.

Therefore, a method for providing a footwear rubber sole of a rubber composition containing a combination of hydrophobic precipitated silica and hydrophilic precipitated silica comprises treating a hydrophilic precipitated silica with a silica coupler in situ within a rubber composition containing at least one of said diene-based elastomers to form a composite thereof within the rubber composition where said silica coupler comprises, for example, at least one of bis(3-triethoxysilylpropyl) polysulfide and organomercaptoalkoxysilane which may optionally include an alkoxysilane, wherein a hydrophilic precipitated silica is thereafter added to the rubber without additional silica coupler. In one embodiment, said subsequently added hydrophilic precipitated silica is added to said rubber composition in a separate mixing step subsequent to said in situ treatment of said hydrophilic precipitated silica to form said hydrophobic precipitated silica. A rubber composition is therefore provided by such method.

In one embodiment, as indicated, said silica coupling agent for treatment (hydrophobation) of said hydrophilic precipitated silica is comprised of bis (3-triethoxysilylpropyl) polysulfide containing an average of from about 2 to about 4 connecting sulfur atoms in its polysulfidic bridge or an organoalkoxymercaptosilane.

In one embodiment, as indicted, an alkoxysilane may also optionally be used, together with said silica coupling agent to hydrophobate the precipitated silica.

In practice, representative of said alkoxysilane is, for example, an alkoxysilane of the general formula (I):

$$Z_n\text{—}Si\text{—}R_{4-n} \quad (I)$$

wherein R is a saturated alkyl radical having from one to 18, preferably from one to 8, carbon atoms such as, for example, methyl, ethyl, isopropyl, n-butyl and octadecyl radicals, n is a value of from 1 to 3 and Z is an alkoxy radical represented as $(R^1O)$—, wherein $R^1$ is a saturated alkyl radical having from one to 3 carbon atoms such as, for example, methyl, ethyl and isopropyl radicals, preferably at least one of methyl and ethyl radicals.

Representative examples of alkoxysilanes of Formula (I) are, for example, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Accordingly, said alkoxysilanes have an alkoxy group being reactive with the hydroxyl groups (e.g. silanol groups) contained on the surface of the precipitated silica aggregates.

In further practice of the invention said footwear sole rubber composition contains, for example from about 2 to about 40, alternately about 5 to about 25 parts by weight per 100 parts by weight rubber (phr), rubber processing oils comprised of:
(A) petroleum based rubber processing oil,
(B) triglyceride vegetable oil, or
(C) Combination of petroleum based rubber processing oil and triglyceride vegetable oil for example about 10 to about 90, alternately about 30 to about 60, weight percent of said triglyceride vegetable oil.

Representative of such triglyceride vegetable oils are, for example soybean oil, sunflower oil, palm oil and rapeseed oil.

In one embodiment, said footwear rubber sole rubber composition also contains at least one traction promoting resin which is desirably comprised of, for example, at least one of styrene/alphamethylstyrene resin, coumarone-indene resin, petroleum hydrocarbon resin, terpene polymer, terpene phenol resin and rosin derived resin.

In one embodiment, the traction promoting resin is a styrene/alphamethylstyrene resin. Such styrene/alphamethylstyrene resin may be, for example, a relatively short chain copolymer of styrene and alphamethylstyrene. In one embodiment, such a resin may be suitably prepared, for example, by cationic copolymerization of styrene and alphamethylstyrene in a hydrocarbon solvent. The styrene/alphamethylstyrene resin may have, for example, a styrene content in a range of from about 10 to about 90 percent. The styrene/alphamethylstyrene resin may have a softening point, for example, in a range of from about 60° C. to about 125° C., alternately from about 80° C. to about 90° C. (ASTM E28). A suitable styrene/alphamethylstyrene resin may be, for example, Resin 2336™ from Eastman or Sylvares SA85™ from Arizona Chemical.

In one embodiment, the resin is a coumarone-indene resin. Such coumarone-indene resin may have a softening point, for example, in a range of from about 30° C. to about 150° C. containing coumarone and indene as the monomer components making up the resin skeleton (main chain). Minor amounts of monomers other than coumarone and indene may be incorporated into the skeleton such as, for example, methyl coumarone, styrene, alphamethylstyrene, methylindene, vinyltoluene, dicyclopentadiene, cycopentadiene, and diolefins such as isoprene and piperylene.

In one embodiment, the resin is a petroleum hydrocarbon resin. Such petroleum hydrocarbon resin may be, for example, an aromatic and/or nonaromatic (e.g. paraffinic) based resin. Various petroleum resins are available. Some petroleum hydrocarbon resins have a low degree of unsaturation and high aromatic content, whereas some are highly unsaturated, and yet some contain no aromatic structure at all. Differences in the resins are largely due to the olefins contained in the petroleum based feedstock from which the resins are derived. Conventional olefins for such resins include any C5 olefins (olefins and di-olefins containing an average of five carbon atoms) such as, for example, cyclopentadiene, dicyclopentadiene, isoprene and piperylene, and any C9 olefins (olefins and di-olefins containing an average of 9 carbon atoms) such as, for example, vinyltoluene and alphamethylstyrene. Such resins may be made from mixtures of such C5 and C9 olefins and di-olefins.

In one embodiment, said resin is a terpene resin. Such resin may be comprised of, for example, polymers of at least one of limonene, alpha pinene and beta pinene and having a softening point in a range of from about 60° C. to about 160° C.

In one embodiment, the resin is a terpene-phenol resin. Such terpene-phenol resin may be, for example, a copolymer of phenolic monomer with a terpene such as, for example, limonene and pinene.

In further accordance with this invention, said rubber composition for said footwear rubber sole rubber composition is provided as being sulfur cured.

In the practice of this invention, the footwear rubber sole may be a rubber composition comprised of various conjugated diene based elastomers. Such diene based elastomers may be polymers and copolymers of conjugated dienes, such as, for example, isoprene and 1,3-butadiene, and copolymers of at least one conjugated diene hydrocarbon and vinyl aromatic compound selected from styrene and alphamethyl styrene, preferably styrene.

For example, representative of such elastomers are natural cis 1,4-polyisoprene rubber, synthetic cis 1,4-polyisoprene rubber, cis 1,4-polybutadiene rubber, vinyl polybutadiene rubber having a vinyl 1,2 content in a range of about 10 percent to about 90 percent, styrene/butadiene copolymer (SBR) rubber (aqueous emulsion or organic solution polymerization prepared copolymers), styrene/isoprene/butadiene terpolymer rubber, butadiene/acrylonitrile rubber, styrene/isoprene copolymer, isoprene/butadiene copolymer rubber, 3,4-polyisoprene rubber and trans 1,4-polybutadiene rubber as well as block polymer rubber comprised of styrene-isoprene-styrene or styrene-butadiene-styrene polymer blocks.

In practice, it may often be desirable for the elastomer(s) of the footwear sole rubber composition intended for ground contact be comprised of primarily (at least 50 percent of its elastomer content) of cis 1,4-polybutadiene rubber.

Such footwear sole rubber composition may also, if appropriate, contain up to about 25 phr of primarily saturated elastomers such as, for example, those comprised of EPDM (ethylene/propylene/non-conjugated diene terpolymer rubber), butyl rubber (copolymer of isobutylene and minor amount, such as for example about 3 about 6 percent, of conjugated diene such as, for example, isoprene) halobutyl rubber (halogenated butyl rubber such as, for example, chlorobutyl and bromobutyl rubber) and brominated copolymers of paramethylstyrene and isobutylene and their mixtures. Non-conjugated dienes for said EPDM may be, for example, at least one of ethylidene norbornadiene, trans 1,4-hexadiene and dicyclopentadiene.

Various commercially available amorphous synthetic silicas (hydrophilic precipitated silicas) may be added to the rubber composition for the reinforcement of the diene based elastomers. Such silicas may be characterized, for example, by their BET and CTAB surface areas. Representative of such silicas, for example, only and without limitation, are silicas available from PPG Industries under the Hi-Sil trademark with designations 210, 243, etc; silicas available from Solvay with designations of Zeosil 1165MP and Zeosil 165GR, silicas available from Evonik with designations VN2 and VN3, and silicas available from Huber such as Zeopol 8745 and Zeopol 8715.

Representative of composites of hydrophobic precipitated silica (a pre-hydrophobated silica for addition to the rubber composition as a precipitated silica treated with a silica coupler) is, for example, Agilon 400™ from PPG.

In further accordance with this invention, an article of footwear is provided which contains said rubber sole.

In an additional embodiment, it is desired to evaluate providing the footwear rubber sole as additionally containing zinc rosinate as a product of zinc oxide and rosin acid in situ within the footwear sole rubber composition, particularly freely added rosin acid to the rubber composition.

Such rosin acid is composed of freely added rosin acid together with any rosin acid which may be contained in an elastomer used in the footwear sole rubber composition. For example, emulsion polymerization prepared butadiene/styrene elastomer (ESBR) may contain from about 2 to about 3 parts by weight rosin acid per 100 parts by weight of the elastomer derived from the emulsion polymerization based production of the elastomer. The term "freely added" relates to rosin acid added as a compounding ingredient to the rubber composition which is in addition to rosin acid which may be contained in an elastomer used in the footwear sole rubber composition. Cis 1,4-polyisoprene elastomer, cis 1,4-polybutadiene elastomer and organic solvent solution polymerization prepared styrene/butadiene elastomer (SSBR) are not likely to contain any appreciable amount, if any, of rosin acid.

The zinc rosinate is considered to be a soap, whereas the rosin acid from which it is derived is not considered to be a fatty acid compared to stearic, palmitic and oleic acids and therefore the zinc rosinate is considered to be significantly differentiated from such products of such fatty acids with zinc oxide. For example, the zinc rosinate is considered to be a relatively sticky soap in the presence of water compared to the aforesaid slippery zinc fatty acid soap, and therefore the zinc rosinate may serve to more effectively promote a combination of wet and dry traction (traction of the footwear sole surface on various substrates under wet and dry substrate surface conditions). Such traction may sometimes be referred to as "grip", particularly where the sole rubber surface becomes wet as may be experienced where the sole surface engages a wet surface.

It is therefore, as indicated, desired to provide zinc rosinate within dual silica containing footwear sole rubber composition instead of, or by replacing at least a portion of, zinc salt of fatty acids such as, for example stearic, palmitic and oleic acids which might normally be provided in the preparation of the rubber composition such as by free addition of such fatty acid and/or by such fatty acid contained in an elastomer (e.g. ESBR if used) of the rubber composition. Zinc rosinate, also as indicated, would be provided as a product of zinc oxide and rosin acid formed in situ within the rubber composition of the footwear sole, where a portion of the zinc rosinate product inherently migrates (blooms) to the outer surface of the footwear rubber sole (and thereby is contained on the surface of the footwear rubber sole intended for substrate surface engagement) to thereby promote wet traction of the footwear sole surface intended for ground engagement (e.g. promote traction of the footwear rubber sole surface in contact with ground surface, particularly a wet ground surface).

In practice, therefore, said dual silica containing footwear sole rubber composition may also contain 1 to about 10, alternately about 3 to about 10, phr of zinc soap comprised of:

(A) zinc rosinate as the product of zinc oxide and freely added rosin acid formed in situ within the rubber composition, or (B) a combination of zinc soaps comprised of:
  (1) about 25 to about 95, alternately about 50 to about 95 weight percent of said zinc rosinate, and
  (2) about 5 to about 75, alternately about 5 to about 50 weight percent of zinc salt as the product of zinc oxide and fatty acid formed in situ within the rubber composition, where said fatty acid contains, and desirably is comprised primarily of a combination of, at least one of stearic, palmitic and oleic acids.

It is readily understood by those having skill in the art that the rubber composition would be compounded by methods generally known in the rubber compounding art, such as mixing the various sulfur-vulcanizable constituent rubbers with various commonly used additive materials which may include one or more of, for example, curing aids, such as sulfur, activators, retarders and accelerators, processing additives waxes, antioxidants and antiozonants, peptizing agents and reinforcing materials.

The presence and relative amounts of the above additives are not considered to be an aspect of the present invention, unless otherwise indicated, which is more primarily directed to footwear and footwear sole rubber composition containing dual silica moieties in a form of hydrophobic precipitated silica and hydrophilic precipitated silica.

The footwear sole rubber composition can be built, shaped, molded and cured by various methods which will be readily apparent to those having skill in such art.

The following Example is provided to further illustrate the invention. The parts and percentages are by weight unless otherwise indicated.

EXAMPLE I

This Example, derived from Example I of U.S. Pat. No. 8,522,847, relates to providing dual silica moieties in a rubber composition for a tire tread in a sense of a hydrophilic precipitated silica and hydrophobic precipitated silica where the hydrophobic precipitated silica is formed in situ within the rubber composition by treatment of a hydrophilic precipitated silica. The Example from U.S. Pat. No. 8,522,847 is presented here for said evaluation of dual precipitated silica moieties in a footwear rubber sole rubber composition.

The experimental rubber composition Sample B was prepared by hydrophobating a hydrophilic precipitated silica in situ within the rubber composition to form an in situ hydrophobated precipitated silica with a silane based hydrophobating agent, namely a bis(3-triethoxysilylpropyl) polysulfide silica coupler, followed by adding additional hydrophilic precipitated silica to the rubber composition in a separate, subsequent, mixing step.

In this manner, then, the second addition of the hydrophilic precipitated silica is completely separate and disconnected from the first addition of hydrophilic silica and coupling agent to form hydrophobated precipitated silica. It is therefore considered herein that little or no hydrophobation of the separately added hydrophilic precipitated silica occurs.

Control rubber Sample A, and comparative rubber compositions Samples C and D, and experimental Sample B, the invention, were prepared by:

(A) control rubber Sample A was provided with only a hydrophilic precipitated silica without a hydrophobated precipitated silica.

(B) comparative rubber Samples C and D were provided with dual in situ hydrophobated precipitated silicas in a manner of first hydrophobating a precipitated silica in situ within a rubber composition followed by then sequentially hydrophobating a second precipitated silica in situ within the same rubber composition.

(C) for experimental rubber Sample B, which represents this invention, addition of hydrophilic precipitated silica and coupling agent in the first mixing stage to produce a hydrophobated silica followed be the separate addition of additional hydrophilic silica in a second non-productive mixing stage (NP2) without an accompanying addition of the silica coupler.

The basic formulations for the Control rubber Sample A, the invention experimental rubber Sample B and comparative rubber Samples C and D are presented in the following Table 1 expressed in parts by weight per 100 parts of rubber unless otherwise indicated.

TABLE 1

|  | Samples | | | |
|---|---|---|---|---|
|  | A | B | C | D |
| First Non-Productive Mixing Stage (NP1) | | | | |
| Synthetic polyisoprene rubber[1] | 100 | 100 | 100 | 100 |
| Carbon black[2] | 20 | 20 | 20 | 20 |
| Processing oil | 6 | 6 | 6 | 6 |
| Fatty acid[3] | 2 | 2 | 2 | 2 |
| Antidegradant(s)[4] | 2 | 2 | 2 | 2 |
| Precipitated (hydrophilic) precipitated silica[5] | 15 | 15 | 15 | 15 |
| Zinc oxide | 5 | 5 | 5 | 5 |
| Silica coupler (50/50 carbon black composite)[6] | 0 | 2.5 | 3 | 4 |
| Second Non-Productive Mixing Stage (NP2) | | | | |
| Precipitated (hydrophilic) silica[5] | 15 | 15 | 15 | 15 |
| Silica coupler (50/50 carbon black composite)[6] | 0 | 0 | 2 | 3.5 |
| Productive Mixing Stage (P) | | | | |
| Sulfur | 1.4 | 1.4 | 1.4 | 1.4 |
| Accelerator(s)[7] | 2.2 | 2.2 | 2.2 | 2.2 |

[1]Cis 1,4-polyisoprene rubber as NAT 2200 from The Goodyear Tire & Rubber Company
[2]N299, rubber reinforcing carbon black, ASTM identification
[3]Primarily stearic acid (at least 90 percent by weight stearic acid)
[4]Quinoline based antidegradant
[5]Pre-hydrophobated precipitated silica composite as Agilon 400 ™ from PPG
[6]Precipitated silica as HiSil 210 ™ from PPG
[7]Sulfenamide and diphenyl guanidine sulfur cure accelerators The following Table 2 illustrates cure behavior and various physical properties of rubber compositions based upon the basic recipe of Table 1 and reported herein as control Sample A, invention Sample B and comparative Samples C and D. Where cured rubber samples are examined, such as for the stress-strain, hot rebound and hardness values, the rubber samples were cured for about 12 minutes at a temperature of about 170° C.

The heading for Table 2 shows the respective non-productive mixing steps, namely NP1 and NP2, in which the hydrophilic silica and hydrophobating agent (silica coupler) were added.

TABLE 2

|  | Samples | | | |
|---|---|---|---|---|
|  | Control A | B | C | D |
| Carbon black (added in NP1) | 20 | 20 | 20 | 20 |
| Silica, hydrophilic (added in NP1) | 15 | 15 | 15 | 15 |
| Silica coupler (added in NP1) | 0 | 2.5 | 3 | 4 |
| Silica, hydrophilic (added in NP2) | 15 | 15 | 15 | 15 |
| Silica coupler (added in NP2) | 0 | 0 | 2 | 3.5 |
| Coefficient of Friction[1] | | | | |
| Wet substrate | 2.6 | 2.4 | 1.5 | 1.2 |
| Dry substrate | 2.8 | 2.8 | 2.9 | 2.6 |

TABLE 2-continued

|  | Samples | | | |
|---|---|---|---|---|
|  | Control A | B | C | D |
| Stress-strain, ATS[2] 14 min, 160° C. | | | | |
| Tensile strength (MPa) | 20.7 | 22.8 | 23.3 | 23.7 |
| Elongation at break (%) | 666 | 581 | 557 | 535 |
| 300% modulus, ring (MPa) | 3.9 | 8.2 | 9.7 | 11 |
| Rebound | | | | |
| 23° C. | 46 | 51 | 50 | 50 |
| 100° C. | 60 | 65 | 64 | 65 |
| Shore A hardness, 23° C. | 57 | 64 | 67 | 69 |
| RPA[3] (100° C.), Storage Modulus G', MPa | | | | |
| Uncured G' 15% strain | 0.18 | 0.18 | 0.18 | 0.18 |
| Cured G' modulus, 10% strain | 1.2 | 1.4 | 1.5 | 1.6 |

[1]ASTM D-1894. A coefficient of friction (COF) value for a rubber sample may be measured, for example, on a Model SP-2000 slip/peel tester from IMASS Inc. at six inches (about 15.2 cm) per minute using a 200 g sled against a substrate surface such as, for example, a polished aluminum surface.
[2]Automated testing system (ATS) instrument by the Instron Corporation which can incorporate as many as six tests in one system. Such instrument may determine ultimate tensile, ultimate elongation, moduli, etc.
[3]Rubber Process Analyzer as RPA 2000 ™ instrument by Alpha Technologies In the above Table 2, it can be seen that the hydrophilic precipitated silica was added in both the first (NP1) and the second (NP2) separate non-productive mixing stages (it was removed from the internal rubber mixer of the NP1 mixing stage, cooled to below 40° C. and then mixed in the NP2 mixing stage in an internal rubber mixer).

It can be observed in Table 2 that, for the dry coefficient of friction, addition of increasing levels of silica coupler to Control rubber Sample A, namely for rubber Samples B, C and D, had no significant effect, although physical properties such as tensile strength, 300 percent modulus, rebound and cured storage modulus (G') at 10 percent strain were significantly improved.

It can further be observed in Table 2 for the wet coefficient of friction, a combined addition of both hydrophilic silica and silica coupler (hydrophobating agent) to both of the sequential non-productive mixing stages (NP1 and NP2) in Samples C and D to therefore form an in situ hydrophobated silica in both the NP1 and NP2 mixing stages had a significant and rather dramatic negative effect on the wet coefficient of friction (wet COF) with reduced values of only 1.5 and 1.2 as compared to a value of 2.6 for the Control rubber Sample A.

In sharp contrast, it can next be observed in Table 2 that, for Sample B, which represents the invention of U.S. Pat. No. 8,522,847, addition of hydrophilic precipitated silica in the separate, second non-productive mixing stage (NP2) without an accompanying addition of the silica coupler (hydrophobating agent) resulted in a comparable wet coefficient of friction (wet COF), namely a value of 2.4, to that of the Control rubber Sample A which has a desirably high wet coefficient of friction (wet COF) value of 2.6.

The sharp contrast becomes even more evident when observing that the beneficial wet coefficient of friction (wet COF) of the surface of rubber Sample B was obtained while other physical properties were significantly improved as compared to Control rubber Sample A, a combination which was not observed for rubber Samples C and D which, instead, had dramatically poorer wet coefficients of friction.

It is concluded from the Example of U.S. Pat. No. 8,522,847 that the addition of the hydrophilic silica and silica coupler (hydrophobation agent) in the first non-productive mixing step (NP1), followed by a separated sequential addition of hydrophilic silica in a second non-productive mixing step (NP2) without the coupling agent addition (hydrophobation agent addition), enabled the preparation of a rubber composition which contained dual silica moieties in a form of an in situ hydrophobated precipitated silica (hydrophobated in situ within the rubber composition) and a hydrophilic precipitated silica where the in situ hydrophobated silica promoted enhanced physical properties of the rubber composition (rubber Sample B) and where the presence of the hydrophilic precipitated silica promoted a suitable wet coefficient of friction (wet COF) for the surface of the rubber composition suitable for a cured tire tread, particularly including its running surface.

Accordingly, it is concluded herein that a footwear rubber sole of a rubber composition containing dual precipitated silica moieties in a sense of the dual precipitated silica moieties provided in a sense of being comprised of hydrophilic precipitated silica and hydrophobic precipitated silica will provide improved wet traction of the footwear rubber sole on a wet surface.

EXAMPLE II

This Example, derived from an example presented in U.S. Pat. No. 9,163,126, relates to providing zinc rosinate in a rubber composition as a product of zinc oxide with rosin acid formed in situ within the rubber composition and thereby relates to the aforesaid evaluation of providing such zinc rosinate in a footwear rubber sole rubber composition.

For this Example, Tables 1 and 2 of said example provided in U.S. Pat. No. 9,163,126 have been re-labeled as Tables 3 and 4, respectively, to present the Tables herein in a chronological sequence.

For this Example, rubber compositions E through J of said example provided in U.S. Pat. No. 9,163,126 have been re-labeled as rubber compositions E through J, respectively, to present the labels herein in a chronological sequence.

For this Example of U.S. Pat. No. 9,163,126, rosin acid was introduced in a rubber composition in combination with zinc oxide to enable an in situ formation of zinc rosinate within the rubber composition, Silica-rich rubber compositions were prepared as rubber Samples E through J. Rubber Sample E was a control rubber sample formulated with 3 phr of zinc oxide and 1 phr of fatty acids comprised of stearic, palmitic and oleic acids to form salts of such fatty acids in situ within the rubber composition. Rubber Samples F and G were formulated with 3 phr and 6 phr of the fatty acids, respectively, while maintaining 3 phr of zinc oxide, rubber Samples H, I, and J were formulated with 3 phr zinc oxide and rosin acid (instead of the aforesaid fatty acids) in amounts of 1, 3 and 6 phr of rosin acid, respectively, to form zinc rosinate in situ within the rubber composition.

The following Table 3 derived from the aforesaid U.S. patent illustrates a summary of the formulations.

TABLE 3

| | phr |
|---|---|
| Non-Productive Mixing Stage (4 min to 170° C. drop temperature) | |
| Solution styrene/butadiene rubber (SBR)[1] | 74 |
| Cis 1,4-polybutadiene rubber[2] | 26 |
| Precipitated silica[3] | 73 |
| Carbon black | 10 |
| Processing oil, wax | 9 |

TABLE 3-continued

| | phr |
|---|---|
| Silane coupling agent[4] | 6.5 |
| Antidegradant[5] | 3 |
| Zinc oxide | 3 |
| Traction resin[6] | 5 |
| Fatty acids (E-G) or rosin acid[7] (H-J) | 1, 3 and 6 |
| Second Non-productive mixing stage (3 minutes to 160° C. drop temperature) | |
| No additional ingredients added | |
| Productive mixing stage (2 minutes to 120° C. drop temperature) | |
| Sulfur | 1.9 |
| Sulfenamide accelerator | 1.7 |
| Diphenyl guanidine accelerator | 1.5 |

[1]SLF31X22 from The Goodyear Tire & Rubber Company
[2]Budene 1207 from The Goodyear Tire & Rubber Company
[3]Z1165MP ™ from Rhone-Poulenc
[4]NXT ™ from GE Silicones
[5]Amine type
[6]Coumarone-indene resin
[7]Gum rosin The rubber composition Samples for the U.S. patent example were prepared by mixing the elastomers together with the identified rubber compounding ingredients in a first non-productive mixing stage (NP) in an internal rubber mixer for about 4 minutes at a temperature of about 170° C. The mixture was then further sequentially mixed in a second non-productive mixing stage (NP) in an internal rubber mixer, with no additional ingredients added, for about 3 more minutes at a temperature of about 160° C. The resulting mixture was then mixed in a productive mixing stage (P) in an internal rubber mixer with curatives for about 2 minutes at a temperature of about 120° C. The rubber composition was cooled to below 40° C. between the non-productive mixing steps and between the second non-productive mixing step and the productive mixing step.

The following Table 4 derived from the aforesaid U.S. patent illustrates the cure behavior and various physical properties of the silica-rich rubber compositions based on the basic recipe of Table 3 and reported herein as rubber Samples E through J.

TABLE 4

| | Samples Control | | | | | |
|---|---|---|---|---|---|---|
| | A | B | C | D | E | F |
| Fatty acids,(phr)—(fatty acid emphasis added here) | 1 | 3 | 6 | 0 | 0 | 0 |
| Rosin acid (phr)—(rosin acid emphasis added here) | 0 | 0 | 0 | 1 | 3 | 6 |
| Processing (uncured rubber processing indicator) | | | | | | |
| Uncured (G')[1] Wet (indicative wet traction)[2] | 256 | 203 | 184 | 249 | 224 | 187 |
| 0° C. Rebound | 19 | 18 | 19 | 18 | 17 | 15 |
| 23° C. Rebound | 36 | 38 | 34 | 34 | 31 | 28 |

TABLE 4-continued

|  | Samples Control | | | | | |
| --- | --- | --- | --- | --- | --- | --- |
|  | A | B | C | D | E | F |
| Handling[3] | | | | | | |
| G' at 10% | 2261 | 1854 | 1598 | 2157 | 2100 | 1477 |
| Modulus at 300% | 10.4 | 9.1 | 8.3 | 10.6 | 9.1 | 7.4 |
| Hot hardness | 60 | 59 | 59 | 59 | 59 | 60 |
| RR (indicative rolling resistance)[4] | | | | | | |
| Rebound, 100° C. | 56 | 58 | 61 | 55 | 52 | 51 |
| TD (tan delta) at 100° C., RPA | 0.14 | 0.12 | 0.11 | 0.14 | 0.14 | 0/.13 |
| Wear (indicative resistance to wear)[5] | | | | | | |
| DIN abrasion | 108 | 137 | 135 | 115 | 131 | 143 |
| COF (coefficient of friction)[6] | | | | | | |
| Dry (dry surface) | 1.54 | 1.53 | 1.57 | 1.62 | 1.56 | 1.64 |
| Wet (wet surface) | 0.32 | 0.34 | 0.33 | 0.35 | 0.43 | 0.52 |
| Tear | | | | | | |
| Original | 82 | 77 | 76 | 81 | 97 | 135 |

[1]Uncured G' was measured using ASTM D6601 on an RPA 2000
[2]Rebound was measured using ASTM D1054
[3]Modulus at 300 was measured using ASTM D1042
[4]Rebound at 100° C. was measured using ASTM D1415
[5]DIN abrasion was measured using ASTM 596.3
[6]Coefficient of friction (COF) measured using ASTM D1894. COF value for a rubber sample may be measured, for example, on a Model SP-200 slip/peel tester from IMASS, Inc. at six inches (about 15.2 cm) per minutes using a 200 g sled against a substrate surface such as, for example, a polished aluminum surface.

From Table 4 it can be seen in Samples E through G that the increase of fatty acid provides no appreciable change in either of the dry or wet coefficient of friction (COF) values.

However, the coefficient of friction values for Samples H, I and J (which contained the zinc rosinate formed in situ within the rubber compositions as a product of rosin acid, instead of the fatty acid and zinc oxide) were dramatically improved for wet substrate conditions as compared to Samples E, F and G and also showed a small improvement for dry COF (dry COF emphasis added here).

Accordingly, it is concluded herein that a footwear rubber sole of a rubber composition containing dual precipitated silica moieties provided in a sense of being comprised of hydrophilic precipitated silica and hydrophobic precipitated silica which also contains a zinc soap in the form of zinc rosinate as a product of zinc oxide and freely added rosin acid, which may be in addition to any residual rosin acid which might be contained in an elastomer in the rubber composition can promote a coefficient of friction of the sole's surface intended for contacting or engaging a substrate surface.

EXAMPLE III

This Example, derived from Example II of U.S. Pat. No. 9,212,275, relates to providing dual silica moieties in a rubber composition and tire with tread thereof in a sense of providing a combination of pre-hydrophobated precipitated silica (hydrophobic precipitated silica) and hydrophilic precipitated silica. The Example is presented here for said evaluation of dual precipitated moieties in a sense of hydrophobic precipitated silica and hydrophilic precipitated silica in a footwear rubber sole rubber composition.

For this Example, Tables 3 and 4 of said Example II of U.S. Pat. No. 9,212,275 have been re-labeled as Tables 5 and 6, respectively, to present the Tables herein in a chronological sequence.

For this Example, rubber compositions C through F of said Example II of U.S. Pat. No. 9,212,275 have been re-labeled as rubber compositions K through N, respectively, to present the labels herein in a chronological sequence.

For this Example of U.S. Pat. No. 9,212,275, experiments are shown as being conducted to evaluate the effect of adding hydrophilic, not pre-treated, precipitated silica to the pre-hydrophobated, (pre-treated), precipitated silica in the internal rubber mixer (Banbury mixer) without addition of silica coupling agent to the compounds (rubber composition Samples). Control rubber Sample K contained 84 phr of the pre-treated silica, whereas rubber Samples L, M and N contained in addition to the 84 phr of the pre-treated silica, 5, 10 and 15 phr, respectively, of the not pre-treated, therefore hydrophilic, precipitated silica.

This example represents an attempt to increase the low strain stiffness of the compound containing pre-treated (pre-hydrophobated) precipitated silica by the addition of various levels of not-treated (therefore hydrophilic) precipitated silica, without the addition of silica coupling agent. The success of this approach and others listed in the following examples demonstrates an ability to increase low strain stiffness, without a significant penalty to hysteresis, to the rubber composition for which a lower hysteresis of the rubber composition is desired to promote an improvement in (lower) tire rolling resistance for the tire with a tread of such rubber composition.

The rubber composition (rubber compound) base is illustrated in the following Table 5 where the parts and percentages are reported in terms parts by weight unless otherwise indicated.

TABLE 5

| First Non-Productive Mixing Stage (NP1) | Parts by weight (phr) |
| --- | --- |
| Functionalized SBR rubber[1] | 60 |
| Natural rubber [2] | 40 |
| Hydrophilic (not pre-treated) precipitated silica[3] | 0, 5, 10, 15 |
| Pre-hydrophobated precipitated silica[4] | 84, 84, 84, 84 |

Ingredients used are as identified in Table 1 of Example I of U.S. Pat. No. 9,212,275 except for amounts and unless otherwise identified.

The following Table 6 illustrates cure behavior and various physical properties of the rubber compositions based upon the compounds of Table 5. Where cured rubber samples are examined, such as for the stress-strain, hot rebound and hardness values, the rubber samples were cured for about 12 minutes at a temperature of about 170° C.

TABLE 6

| | Samples (phr) | | | |
|---|---|---|---|---|
| | K | L | M | N |
| Materials (phr) | | | | |
| Functionalized SBR elastomer | 60 | 60 | 60 | 60 |
| Hydrophilic (not pre-treated) precipitated silica | 0 | 5 | 10 | 15 |
| Pre-hydrophobated precipitated silica | 84 | 84 | 84 | 84 |
| Silica coupling agent | 0 | 0 | 0 | 0 |
| Properties | | | | |
| Tire Tread Predictive Handling Properties Cured storage modulus (G')[1] at 100° C., 11 Hertz (RPA)[1] | | | | |
| 1 percent strain (MPa) | 1220 | 1367 | 1599 | 2338 |
| 10 percent strain (MPa) | 1000 | 1076 | 1183 | 1489 |
| Tire Tread Rolling Resistance Predictive Properties (higher values for rebound and lower values for tan delta are predictive of beneficial reduction in tire rolling resistance) | | | | |
| Rebound (100° C.) | 63 | 60 | 59 | 59 |
| Tan delta (100° C., 10% strain, 11 Hertz) | 0.121 | 0.118 | 0.114 | 0.091 |
| Tire Tread Predictive Wet Traction Property | | | | |
| Rebound, 0° C. | 7.3 | 7.6 | 7.7 | 7.8 |
| Tire Treadwear Predictive Property Abrasion Resistance(rate of abrasion, lower is better) | | | | |
| Grosch abrasion[2], Medium, mg/km | 53 | 59 | 65 | 74 |
| Tear Strength[3], (peal strength) N | | | | |
| At 95° C. for testing | 61 | 72 | 55 | 64 |

[1,2,3]Test procedures as in Example I (of U.S. Pat. No. 9,212,275 which is incorporated herein in its entirety)

It can be seen in Table 6 that the low strain stiffness of rubber Sample (Compound) K, the control, can be significantly increased with only a minor penalty to hysteresis, as indicated by rebound and as indicated by tan delta physical properties, by the addition of low levels of not-treated precipitated silica (therefore hydrophilic precipitated silica), in Compounds (rubber Samples) L, M, N.

This is considered to be significant in a sense that it is seen that an advantage can therefore be taken of the low hysteresis properties of the rubber promoted by the pre-treated precipitated silica (pre-hydrophobated precipitated silica), through small additions of the hydrophilic precipitated silica with a resulting improvement of the low strain stiffness properties which are significant for promoting wet and dry handling tire performance for a tire tread.

Accordingly, it is concluded herein that a footwear rubber sole of a rubber composition containing dual precipitated silica moieties in a sense of a combination of hydrophobic precipitated silica (as a pre-hydrophobated precipitated silica prior to addition to the rubber composition), together with a hydrophilic precipitated silica (a precipitated silica which is provided to the rubber composition without being pre-hydrophobated) can provide beneficial physical property(ies) for the footwear rubber sole.

While representative embodiments and details have been shown for the purpose of illustrating the invention, it will be apparent to those skilled in this art that various changes and modifications may be made therein without departing from the spirit or scope of the invention.

What is claimed is:

1. A footwear rubber sole intended for ground engagement comprised of a rubber composition which contains at least one conjugated diene-based rubber and filler reinforcement, the filler reinforcement comprising:

dual silica moieties in the form of an in situ hydrophobic precipitated silica and a hydrophilic precipitated silica; the hydrophobic precipitated silica being formed by a combination of a hydrophilic silica and a silica coupler in a first step and the hydrophilic precipitated silica being formed by addition of a hydrophilic silica absent the coupling agent in a different step; the hydrophilic precipitated silica for promoting wet traction of the footwear rubber sole on a wet surface;

wherein said rubber composition contains rubber processing oil comprised of a combination of petroleum-based rubber processing oil and vegetable triglyceride oil.

2. The footwear rubber sole of claim 1 wherein said hydrophobic precipitated silica is a precipitated silica treated with silica coupler comprised of at least one of bis(3-triethoxysilylpropyl) polysulfide and organomercaptoalkoxysilane.

3. The footwear rubber sole of claim 2 where said silica coupler is used together with an alkoxysilane.

4. The footwear rubber sole of claim 1 wherein said hydrophobic precipitated silica is provided as a pre-treated hydrophilic precipitated silica with a silica coupler comprised of at least one of bis(3-triethoxysilylpropyl) polysulfide and organomercaptoalkoxysilane.

5. The footwear rubber sole of claim 4 wherein said pre-treatment of said hydrophilic precipitated silica additionally includes treatment with an alkoxysilane.

6. The footwear rubber sole of claim 1 wherein said hydrophobic precipitated silica is provided as a hydrophylic precipitated silica treated in situ within said rubber composition with a silica coupler comprised of at least one of bis(3-triethoxysilylpropyl) polysulfide and organomercaptoalkoxysilane prior to separate, subsequent addition of a hydrophilic precipitated silica and optionally an alkoxysilane.

7. The footwear rubber sole of claim 1 wherein said conjugated diene-based rubber is comprised of polymer(s) of at least one of isoprene and 1,3-butadiene monomers and of styrene with at least one of isoprene and 1,3-butadiene monomers.

8. The footwear rubber sole of claim 7 where said rubber composition contains at least one of cis 1,4-polyisoprene, cis 1,4-polybutadiene, styrene/butadiene rubber and block polymers comprised of styrene-isoprene-styrene or styrene-butadiene-styrene polymer blocks.

9. The footwear rubber sole of claim 7 where said rubber composition contains cis 1,4-polybutadiene rubber and at least one of cis 1,4-polyisoprene and styrene/butadiene rubber.

10. The footwear rubber sole of claim 8 where said rubber composition also contains up to 25 phr of primarily saturated elastomers comprised of at least one of EPDM (ethylene/propylene/non-conjugated diene terpolymer rubber), butyl rubber, halobutyl rubber and brominated copolymers of paramethylstyrene and isobutylene and their mixtures, wherein non-conjugated dienes for said EPDM are comprised of at least one of ethylidene norbornadiene, trans 1,4-hexadiene and dicyclopentadiene.

11. The footwear rubber sole of claim 1 wherein said rubber composition contains a rubber processing oil comprised of:
(A) petroleum based rubber processing oil,
(B) vegetable triglyceride oil, or
(C) combination of petroleum-based rubber processing oil and vegetable triglyceride oil.

12. The footwear rubber sole of claim 11 which contains vegetable triglyceride oil comprised of at least one of soybean oil, sunflower oil, palm oil and rapeseed oil.

13. The footwear rubber sole of claim 1 wherein said rubber composition is cured with at least one of elemental sulfur and organic peroxide.

14. The footwear rubber sole of claim 1 wherein said rubber composition is cured with elemental sulfur together with at least one sulfur cure accelerator.

15. The footwear rubber sole of claim 1 wherein said rubber composition contains traction promoting resin comprised of as least one of styrene/alphamethylstyrene resin, coumarone-indene resin petroleum hydrocarbon resin, terpene polymer, terpene phenol resin and rosin derived resin and copolymers thereof.

16. The footwear rubber sole of claim 1 where the rubber composition of said sole further contains from about 1 to about 10 phr of zinc rosinate as a product of zinc oxide and freely added rosin acid in situ within said rubber composition.

17. The footwear rubber sole of claim 1 which comprises, based upon parts by weight per 100 parts by weight of rubber (phr):
(A) at least one conjugated diene-based elastomer, and
(B) about 20 to about 120 phr of reinforcing filler comprised of:
(1) precipitated silica, or
(2) a combination of precipitated silica and rubber reinforcing carbon black containing up to about 60 phr of rubber reinforcing carbon black;
wherein said precipitated silica of (B)(1) and (B)(2) is comprised of:
(3) about 50 to about 95 weight percent of composite of hydrophobic precipitated silica, and
(4) about 5 to about 50 weight percent hydrophilic precipitated silica.

18. A method for providing a footwear rubber sole of a rubber composition containing a combination of hydrophobic precipitated silica and hydrophilic precipitated silica which comprises:
(A) pre-treating a hydrophilic precipitated silica with a silica coupler to form a composite thereof, where said silica coupler comprises at least one of bis(3-triethoxysilylpropyl) polysulfide and organomercaptoalkoxysilane optionally including alkoxysilane, addition of said composite to a rubber composition containing at least one diene-based elastomer and wherein a hydrophilic precipitated silica is added to the rubber composition without additional silica coupler either prior to, coincidentally with or subsequent to said hydrophobic precipitated silica,
(B) treating a hydrophilic precipitated silica with a silica coupler in situ within a rubber composition containing at least one diene-based elastomer with a silica coupler to form a composite thereof within the rubber composition wherein said silica coupler comprises at least one of bis(3-triethoxysilylpropyl) polysulfide and organomercaptoalkoxysilane optionally including an alkoxysilane, and thereafter adding a hydrophilic precipitated silica to the rubber composition without additional silica coupler wherein said subsequently added hydrophilic precipitated silica is added to said rubber composition in a separate and subsequent mixing step from said in situ treatment of said hydrophilic precipitated silica to form a hydrophobic precipitated silica.

19. An article of footwear comprised of a combination of an upper portion and a sole portion where said sole portion is comprised of the footwear rubber sole of claim 1.

* * * * *